US010493417B2

(12) United States Patent
Cornett et al.

(10) Patent No.: US 10,493,417 B2
(45) Date of Patent: Dec. 3, 2019

(54) METHOD FOR LOADING PELLETS

(71) Applicant: Tubemaster, Inc., Louisville, KY (US)

(72) Inventors: Douglas Keith Cornett, LaGrange, KY (US); Clifford L Johns, Plano, TX (US); Dennis Patrick McAndrews, Jeffersonville, IN (US)

(73) Assignee: Tubemaster, Inc., Louisville, KY (US)

( * ) Notice: Subject to any disclaimer, the term of this patent is extended or adjusted under 35 U.S.C. 154(b) by 0 days.

(21) Appl. No.: 15/955,761

(22) Filed: Apr. 18, 2018

(65) Prior Publication Data

US 2018/0304219 A1 Oct. 25, 2018

Related U.S. Application Data

(60) Provisional application No. 62/487,527, filed on Apr. 20, 2017.

(51) Int. Cl.
*B01J 8/00* (2006.01)

(52) U.S. Cl.
CPC ............... *B01J 8/003* (2013.01); *B01J 8/004* (2013.01); *B01J 2208/00752* (2013.01); *B01J 2208/00778* (2013.01)

(58) Field of Classification Search
CPC .. B01J 8/003; B01J 8/004; B01J 2208/00752; B01J 2208/00778; B01J 8/1863; B01J 8/228; B01J 8/388; B65B 31/02; B65B 31/06; B65B 3/28; B65B 3/26; B65B 39/12; B65B 39/00; B65B 39/004; B67C 3/22; B67C 3/283; B67D 7/48; B67D 7/38
USPC ........ 141/63, 70, 83, 266, 279, 284; 422/145
See application file for complete search history.

(56) References Cited

U.S. PATENT DOCUMENTS

2007/0098605 A1 5/2007 Johns
2013/0140322 A1 6/2013 Johns

FOREIGN PATENT DOCUMENTS

LT 5866 B * 9/2012
RU 2180265 C1 * 3/2002 ............. B01J 8/002

* cited by examiner

*Primary Examiner* — Mary E McManmon
*Assistant Examiner* — Stephanie A Shrieves
(74) *Attorney, Agent, or Firm* — Duncan Galloway Egan Greenwald PLLC; Theresa Camoriano; Guillermo Camoriano

(57) ABSTRACT

A method for loading pellets into receptacles having an open top end and a bottom end uses a pressurized fluid injected through injector tubing to form virtual blankets at a plurality of elevations inside the receptacle to reduce the acceleration of the falling pellets in order to provide gentle loading of the pellets.

14 Claims, 9 Drawing Sheets

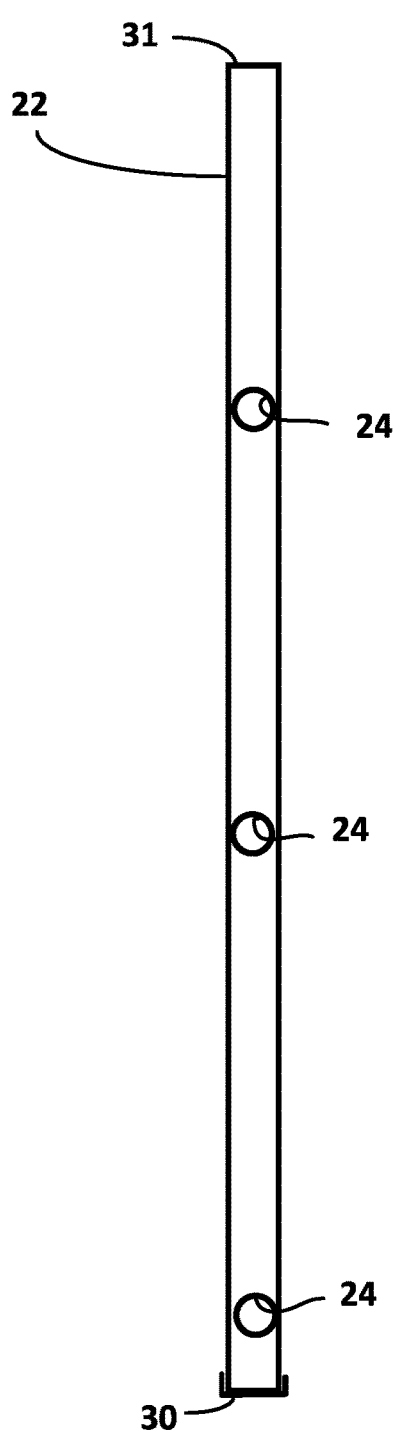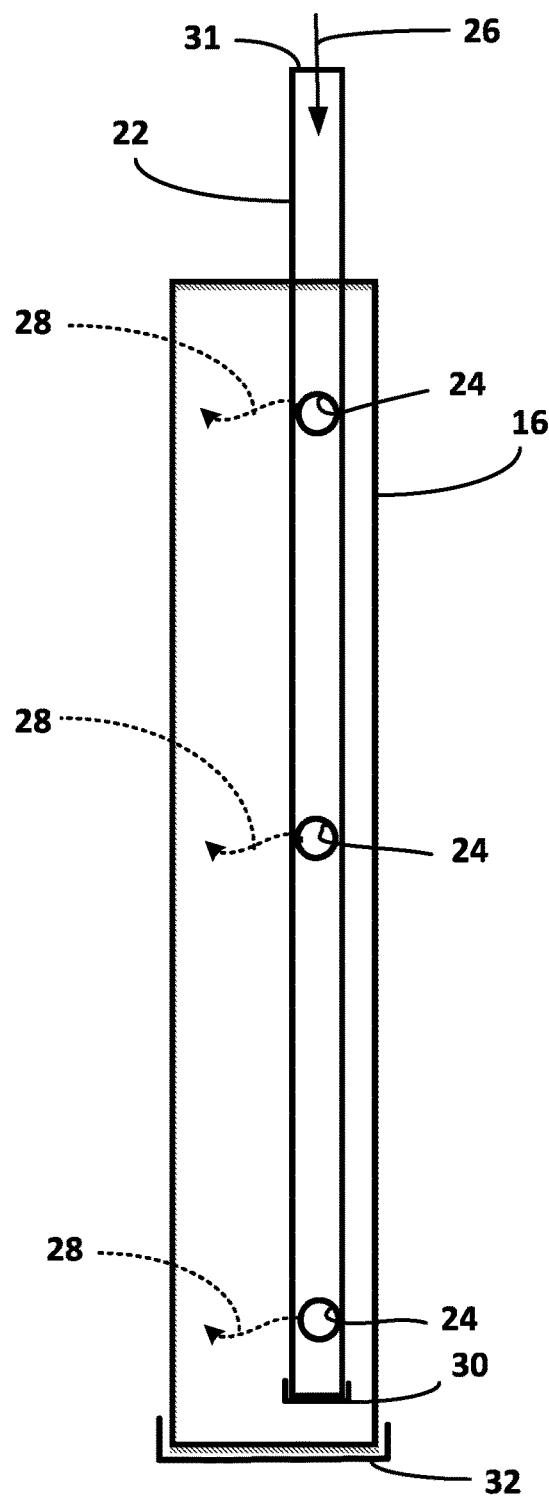
Fig 5
Fig 6

METHOD FOR LOADING PELLETS

This application claims priority from U.S. Provisional Application Ser. No. 62/487,527 filed Apr. 20, 2017, which is hereby incorporated herein by reference.

BACKGROUND

The present invention relates to a method for loading pellets into receptacles, such as, for example, loading catalyst into the vertical reactor tubes of a chemical reactor or a furnace.

Many chemical reactors are essentially a large shell and tube heat exchanger vessel, with the reaction occurring inside the tubes and a coolant circulating in the vessel outside the tubes. Furnace tubes are open gas fired from the outside along their vertical length while being mounted to a fixed manifold at the bottom and outlet pipes at the top. A chemical reactor vessel also can be a simple tank with a single volume of catalyst inside it, or it may be a single large tube. Some chemical reactions occur in steam reformer furnace and other tubes, which may be a part of a system with 10 to 500 or more such tubes. In any of these vessels and tubes, catalyst, typically in the form of pellets (and other types of pellets that are not catalyst), may be loaded into the tubes or vessels. The pellets are replaced periodically.

The tubes may be quite long, housed in a structure several stories tall, and the pellets may be transported up several stories to an elevation above the top of the tubes so they may then flow by gravity into the tubes. For instance, the tubes in many furnaces may be in excess of 45 feet (15 meters) long.

There is an effort in the catalyst industry to manufacture higher quality catalyst resulting in improved conversion efficiency. The conversion efficiency is impacted not only by the initial quality of the catalyst but also by the loading efficiency of the catalyst pellets. The pellets are carefully loaded into each reactor or furnace tube (there may be several thousand tubes in a single reactor) to try to uniformly fill each tube.

The catalyst pellets often are very frangible, that is, it is very fragile and brittle. The effort on behalf of the catalyst manufacturers to obtain a higher performance quality catalyst has resulted in even more delicate catalyst pellets with a lower crush strength. It is desirable to prevent degradation of the pellets during the handling and especially during the loading process. Dropping a pellet down a 45-foot-long reactor or furnace tube results in a high probability of breaking and degradation of the pellet, which is undesirable.

Pellets that are falling down a long tube achieve substantial velocity and kinetic energy, which must be dissipated when they land at the bottom of the tube or on top of other pellets. It can take time for pellets to dissipate their energy and come to rest. Some pellets may fracture simply by falling down the length of their respective tube. If the pellets are not given enough time to come to rest before other pellets are loaded on top of them, the packing density may be reduced, which is undesirable.

Many devices and methods have been used in the past to reduce the velocity and kinetic energy of the pellets as they are falling down a tube, including springs, "whiskers", spiral ramps and other mechanical devices against which the pellets impact or slide along as the pellets flow downwardly through the receiving tube. Unfortunately, the repeated impacts of the pellets against these mechanical devices also tend to degrade the fragile pellets.

There exists a need for a device and a method for loading these pellets into reactor or furnace tubes (or other receptacles) that reduce the velocity and kinetic energy in order to reduce damage to the pellets and improve the packing density.

SUMMARY

The present invention relates to loading devices and methods for loading pellets into receptacles using a pressurized gas (such as compressed air) to reduce the acceleration to be less than the natural acceleration of the pellets due to gravity as the pellets fall. The compressed air is released at a plurality of elevations along the length of the receiving tube or other receptacle (such as a box or a reactor vessel) to provide a plurality of "virtual blankets" of air for the falling pellets to impinge upon so as to reduce the acceleration of the pellets along the length of the receiving tube or other receptacle, allowing for a soft landing of each pellet.

BRIEF DESCRIPTION OF THE DRAWINGS

FIG. 5 is a side view of tubing used for decelerated loading of pellets inside a tube;

FIG. 6 is a side view of the tubing of FIG. 5 inside the tube to be loaded with pellets;

DESCRIPTION

Figure 1:
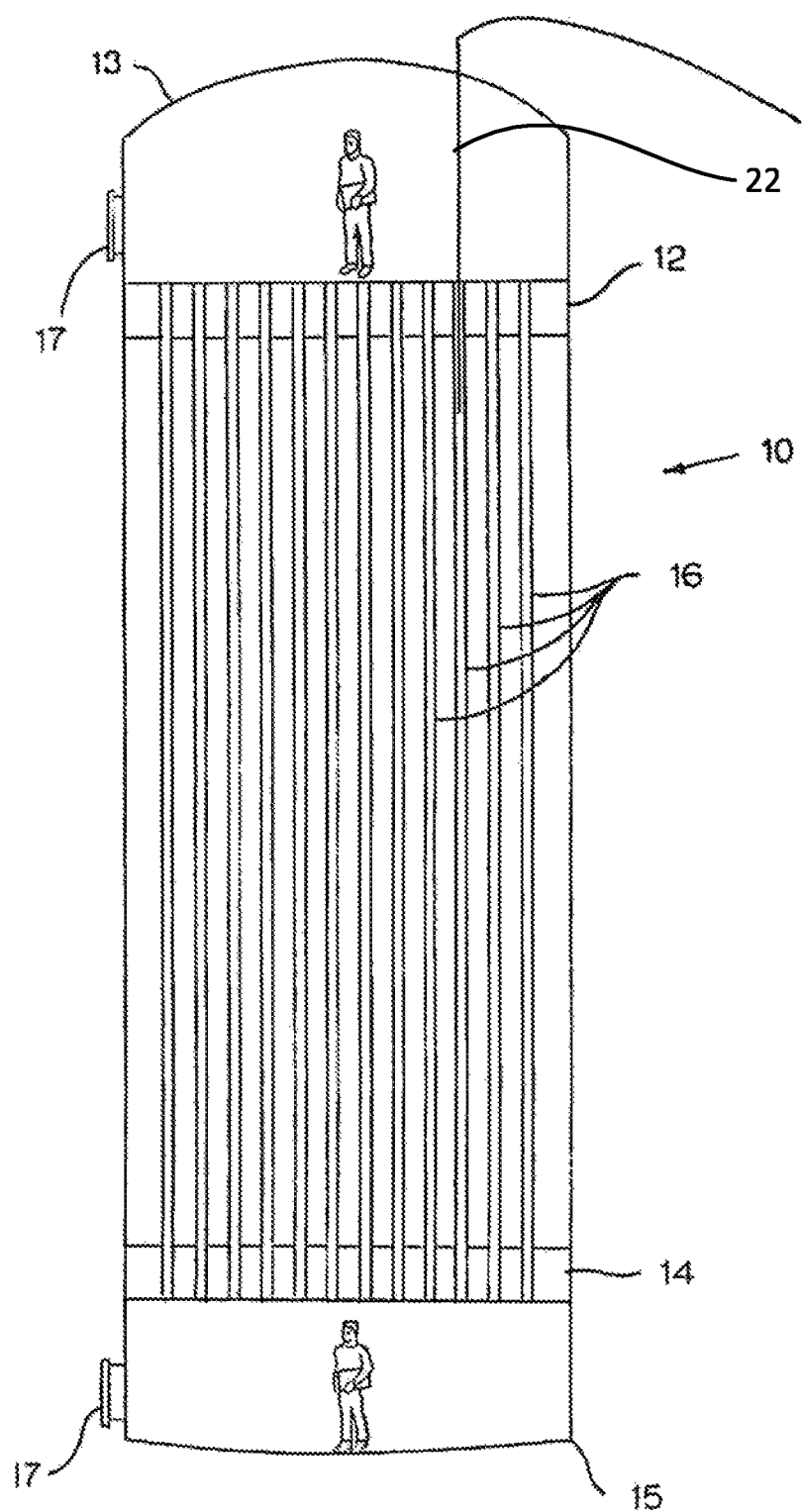
FIG. 1 is a schematic, section view of a shell and tube type of chemical reactor vessel.

FIG. 1 depicts a typical chemical reactor vessel 10, which is a shell and tube heat exchanger, having an upper tube sheet 12 and a lower tube sheet 14 with a plurality of vertical reactor tubes 16 welded or expanded to the tube sheets 12, 14 to form a tightly packed tube bundle. There may be from one to many hundreds or even thousands of cylindrical tubes 16 extending between the tube sheets 12, 14. Each tube 16 has a top end adjacent the upper tube sheet 12 and a bottom end adjacent the lower tube sheet 14, and the tubes 16 are open at both ends, except that there is a clip at the bottom end to retain catalyst or other pellets inside the reactor tube 16. The upper and lower tube sheets 12, 14 have openings that are the size of the outside diameter of the tubes 16, with each tube 16 located in its respective openings in the upper and lower tube sheets 12, 14.

The vessel 10 includes a top dome (or top head) 13 and a bottom dome (or bottom head) 15, as well as manways 17 for access to the tube sheets 12, 14 inside the vessel 10. The manways are closed during operation of the reactor but are opened for access, such as during catalyst handling. In this instance, the reactor tubes 16 are filled with catalyst pellets, which facilitate the chemical reaction. (It may be noted that similarly-shaped shell and tube heat exchangers may be used for other purposes, such as for a boiler, a furnace, or other heat exchanger.)

This particular reactor vessel 10 is fairly typical. Its tubes may range in length from 5 feet to 65 feet, and it is surrounded by a structural steel skid or framework (not shown), which includes stairways or elevators for access to the tube sheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, resulting in considerable cost due to lost production. The loading devices shown and described herein may be used both for the initial loading of a new reactor and for catalyst change operations. (They also may be used for other situations in which pellets are to be loaded into a receptacle that extends downwardly from a top opening.) It is desirable to minimize the amount of time required for the catalyst change operation including loading in order to minimize the lost production and accompanying cost caused by the reactor shutdown, while still providing gentle loading of the pellets.

Figure 2:
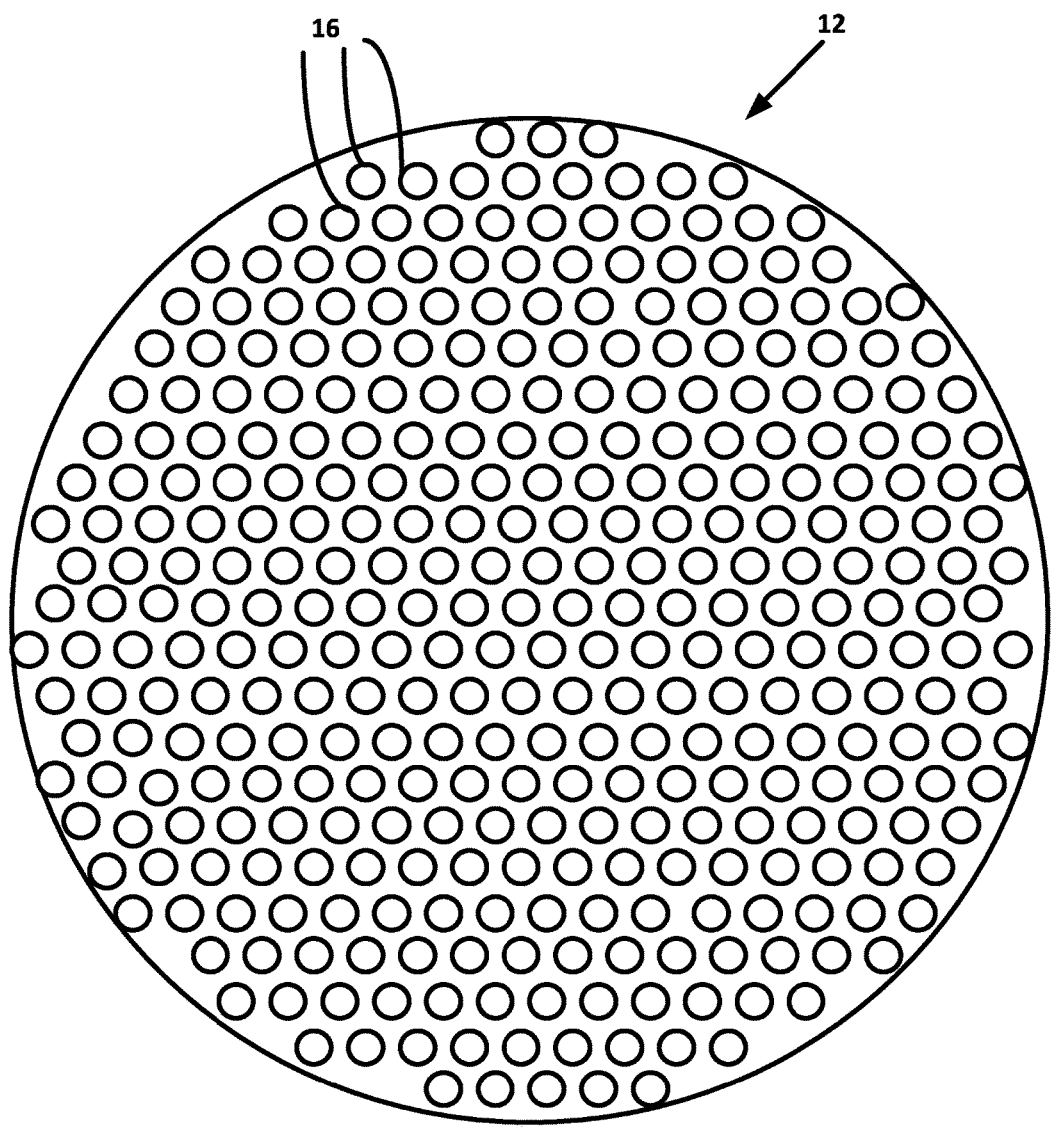
FIG. 2 is a plan view of the upper tube sheet of the reactor of FIG. 1.
Figure 3:
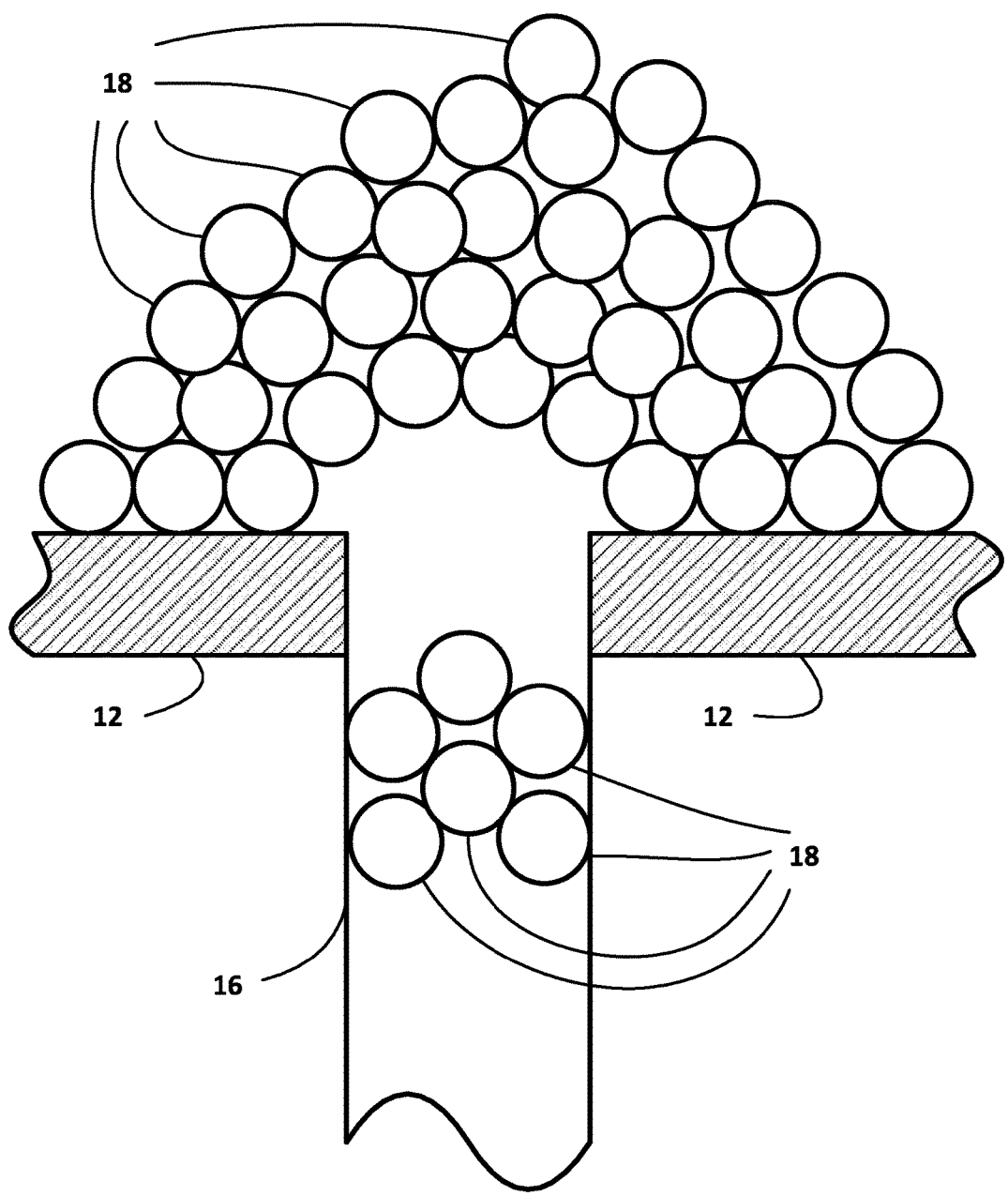
FIG. 3 is a broken away, schematic section view of a single reactor tube, tube sheet, and pellets, showing the pellets bridging across the top opening of the reactor tube, and illustrating catalyst bridging inside a reactor tube.

FIG. 2 is a schematic plan view of the upper tube sheet 12 of FIG. 1, including a plurality of reactor tubes 16 (and is identical to the lower tube sheet 14). As shown in FIG. 3, catalyst pellets 18 may bridge over the open top end of the reactor tube 16 (the receptacle) when trying to load catalyst into the reactor tube 16, which prevents the pellets from entering into the reactor tube 16. Furthermore, if two or more pellets 18 fall into the top opening of the reactor tube at approximately the same time, the conditions are favorable for forming a bridge inside the reactor tube 16 which creates a void or space below the bridged catalyst inside the tube 16, preventing the catalyst from uniformly and completely filling the reactor tube 16 and resulting in a non-uniform and undesirable catalyst loading of the reactor tube 16.

Figure 4:
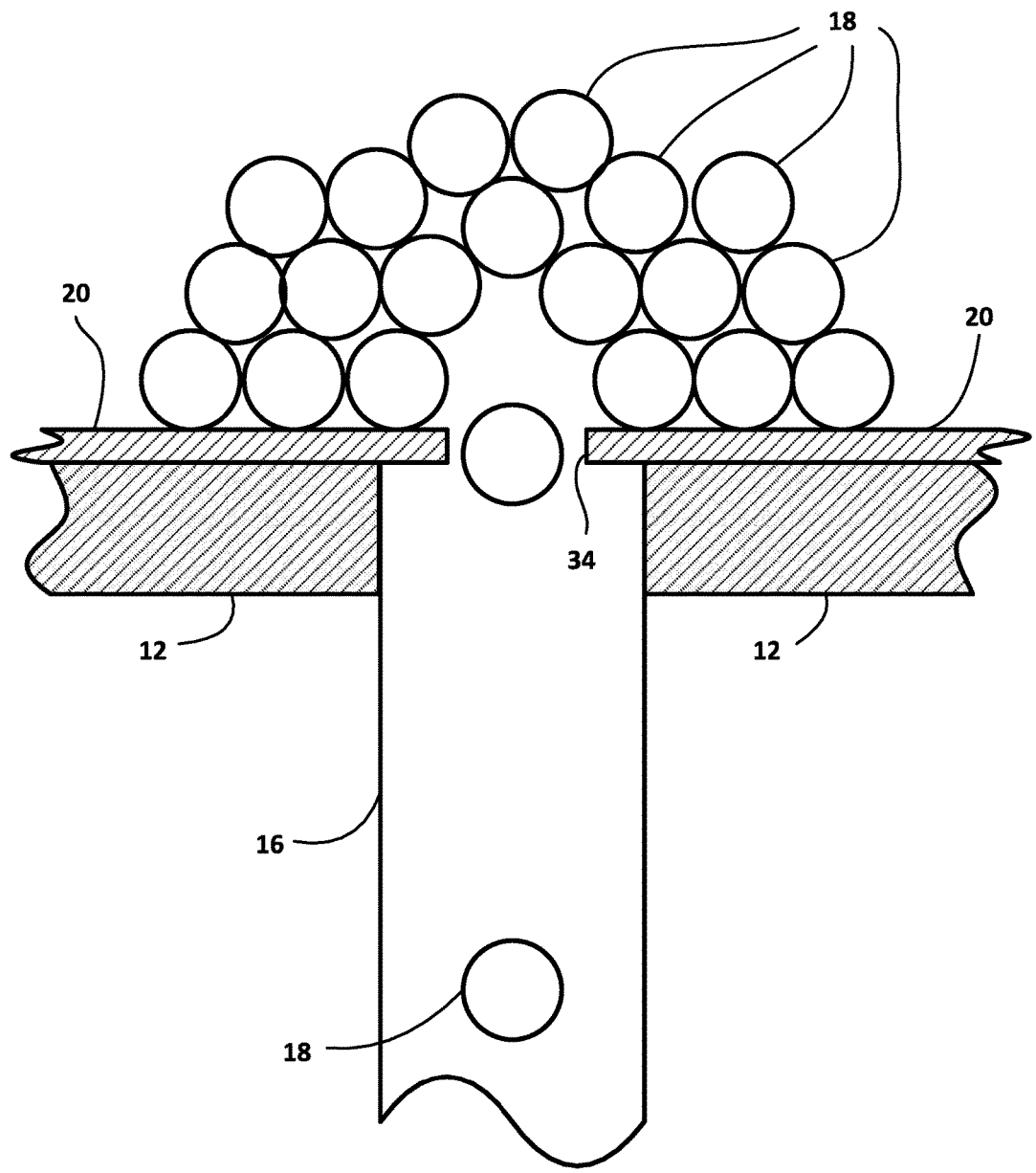
FIG. 4 is a broken away schematic section view, similar to FIG. 3, but with the addition of a surface above the reactor tube which defines an opening into the reactor tube that has a smaller diameter than the diameter of the reactor tube so as to prevent bridging of the pellets inside the reactor tube as the tube is being loaded.
Figure 8:
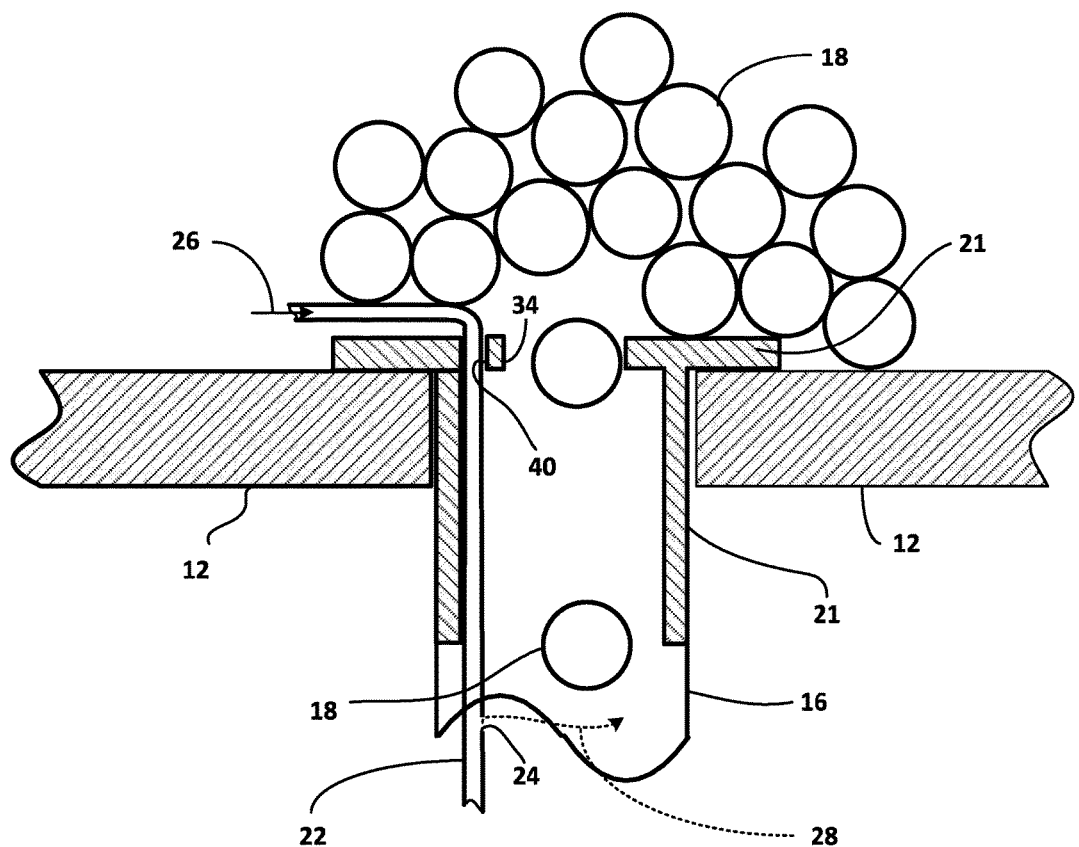
FIG. 8 is a side view, similar to FIG. 4, but using a loading sleeve

To prevent bridging of catalyst pellets 18 inside the reactor tube 16, installers have relied on templates 20 (as shown in FIG. 4) or loading sleeves (similar to the loading sleeve 21 of FIG. 8) which have smaller-diameter openings 34 than the inside diameters of the reactor tubes 16 and thereby restrict the flow of pellets 18 into the reactor tubes 16 so as to prevent bridging inside the tubes 16. (i.e., if the pellets flow through the tube 16 in "single file" or few enough at a time that they cannot span the full diameter of the tube at any one time, bridging will not occur.) It should be noted that this bridging condition is not so prevalent in furnace or reformer tubes, since the inside diameter of these tubes (typically in the 4 inch and larger range) is considerably larger than the largest dimension of the pellets loaded into these tubes.

FIGS. 1 and 5-8 show thin, flexible, hollow gas injector tubing 22, such as polyethylene tubing, which is inserted into each receiving tube or receptacle 16 to aid in the decelerated loading of the pellets as described in more detail below.

Referring to FIG. 5, the gas injector tubing 22 includes a plurality of vertically-spaced-apart, radially-aligned openings 24, each opening 24 extending through the wall of the injector tubing 22, providing fluid communication for a pressurized fluid (such as compressed air 26, See FIG. 6) to flow from inside the injector tubing 22 to the outside of the injector tubing 22 and into the inside of the receiving tube or receptacle 16. The first end 30 of the injector tubing 22 is inserted into the receptacle 16. The second end 31 of the injector tubing 22 receives the pressurized air 26 from a compressed air source, as shown in FIG. 6. (The pressurized air 26 flows into the injector tubing 22 from the second end 31 and exits the injector tubing 22 through the plurality of openings 24 into the receptacle 16. The pressurized air 26 then flows out of the receiving tube 16 through a vacuum manifold 38 at the top of the receiving tube 16 to a vacuum source 36, as shown in FIG. 7.

The pressurized air 26 forms a plurality of localized "virtual blankets" 28 just outside of each of the openings 24 on the injector tubing 22. This series of localized air pressure blankets 28 at discrete elevations along the length of the injector tubing 22 provides a decelerating force which acts on each of the catalyst pellets 18 as they fall through the receiving tube 16 during the catalyst loading process.

The openings 24 may be located every foot, every six inches, every meter, or at any desired spacing, which may be uniform or non-uniform, to achieve the desired decelerating effect. The openings 24 preferably are radially aligned, so they all exert a force in the same direction on the injector tubing 22, tending to push the injector tubing 22 against one side of the receptacle 16. The first end 30 of the injector tubing 22 preferably is sealed off by a cap, by a plug, by heat sealing the tubing 22 to itself, or by other known means. If a template or loading sleeve 21 is used, as in FIG. 8, the first end 30 of the injector tubing 22 is inserted into the top of the receiving tube 16 through a small opening 40 (See FIG. 8) in the template or loading sleeve 21 or other loading device, or the first end 30 of the injector tubing 22 may be inserted into the same opening 34 through which the pellets pass into the receiving tube 16. The manifold 38 and vacuum line 36 are not shown in FIG. 8 but are also present in that embodiment, just as they are in the embodiment of FIG. 7. Once the first end 30 of the injector tubing 22 lies adjacent to the bottom of the receptacle 16, the loading can begin. The injector tubing 22 then is gradually removed from the receptacle 16 as the pellets fall into the receptacle 16, forming a rising level of pellets, so that the first end 30 of the injector tubing 22 stays above the level of pellets as the pellets continue being introduced into the receptacle 16.

Figure 7:
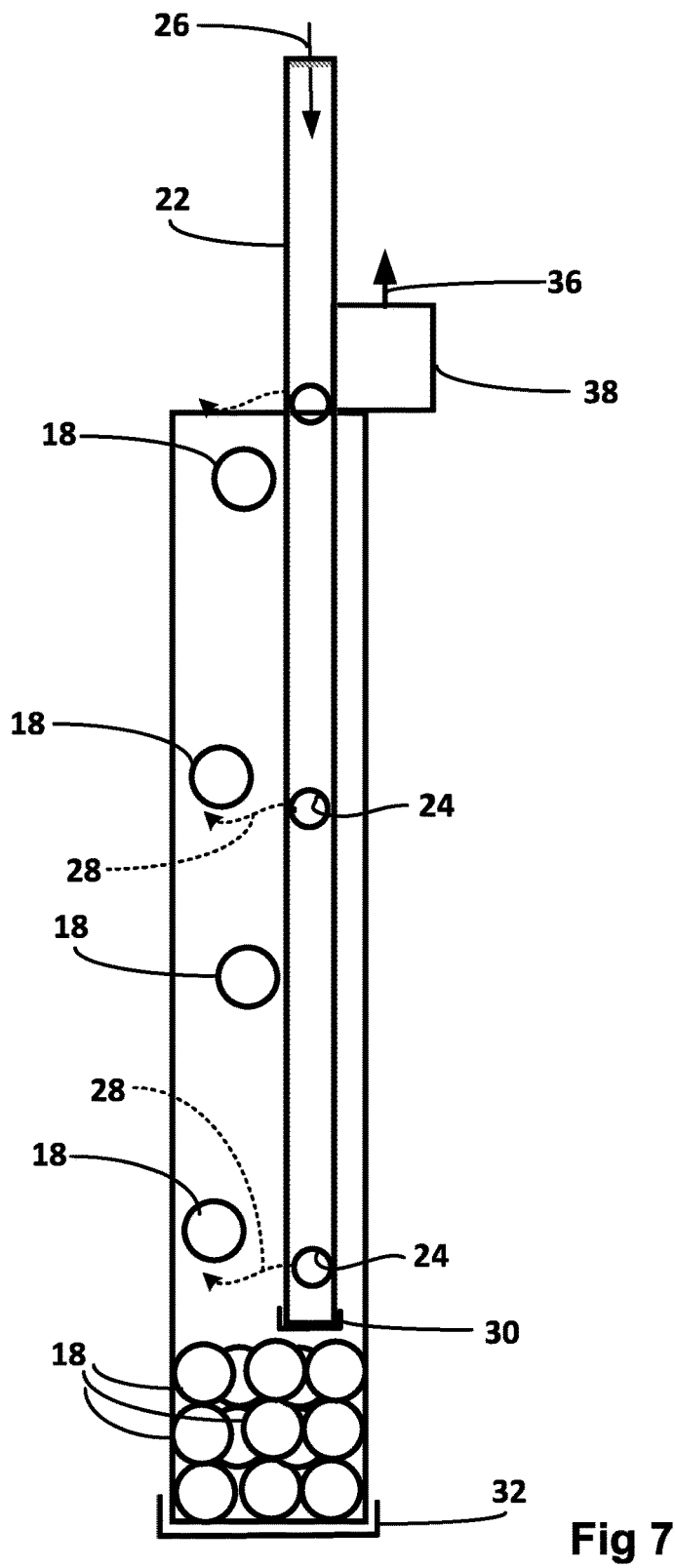
FIG. 7 is a side view, similar to FIG. 6, but showing the pellets being loaded into the tube.

Referring to FIG. 7, each virtual "blanket" 28 is preferably just strong enough to decelerate, but not to totally stop or even reverse, the downward motion of the catalyst pellets 18 as they fall through the receiving tube 16 as well as being strong enough to force small fines and dust to the top of the receiving tube 16. Each catalyst pellet is slowed down as it passes by an opening 24 in the injector tubing 22, and each pellet eventually settles down gently on the clip 32* (See FIG. 9) at the bottom of the receiving tube 16 or on top of the previously deposited catalyst pellets 18, forming a rising level of pellets in the receptacle 16.

In one embodiment, the injector tubing 22 is made from thin, flexible material, such as polyethylene tubing, which is also thermally stable so that the openings 24 remain substantially of the same size despite fluctuations in the temperature of the pressurized fluid. The openings can be single or multiple at each or any location along the injector tubing 22 and can be of various types including precision orifices, not shown. Also in one embodiment, as explained earlier, the openings 24 are radially aligned so that, once the pressurized air 26 is turned on, the force of the pressurized air being ejected through the radially aligned openings 24 pushes the injector tubing 22 toward one side of the receiving tube 16 (as shown in FIG. 7), providing more unrestricted room for the catalyst pellets 18 to fall down along the length of the receiving tube 16 without tending to bridge. Again, the virtual air "blankets" 28 provide a decelerating force on each catalyst pellet. The rate of loading of the pellets 18 into the receiving tube 16 is controlled to prevent bridging inside the receiving tube 16 during the loading process as well as to ensure each pellet has the same velocity upon contacting other pellets already loaded along the entire length of the tube.

The injector tubing 22 is gradually pulled out of the receiving tube 16 as the pellets are loaded into the receiving tube 16 so that the closed first end 30 of the injector tubing 22 is always a desired distance above the level of pellets in the receiving tube 16.

Figure 9:
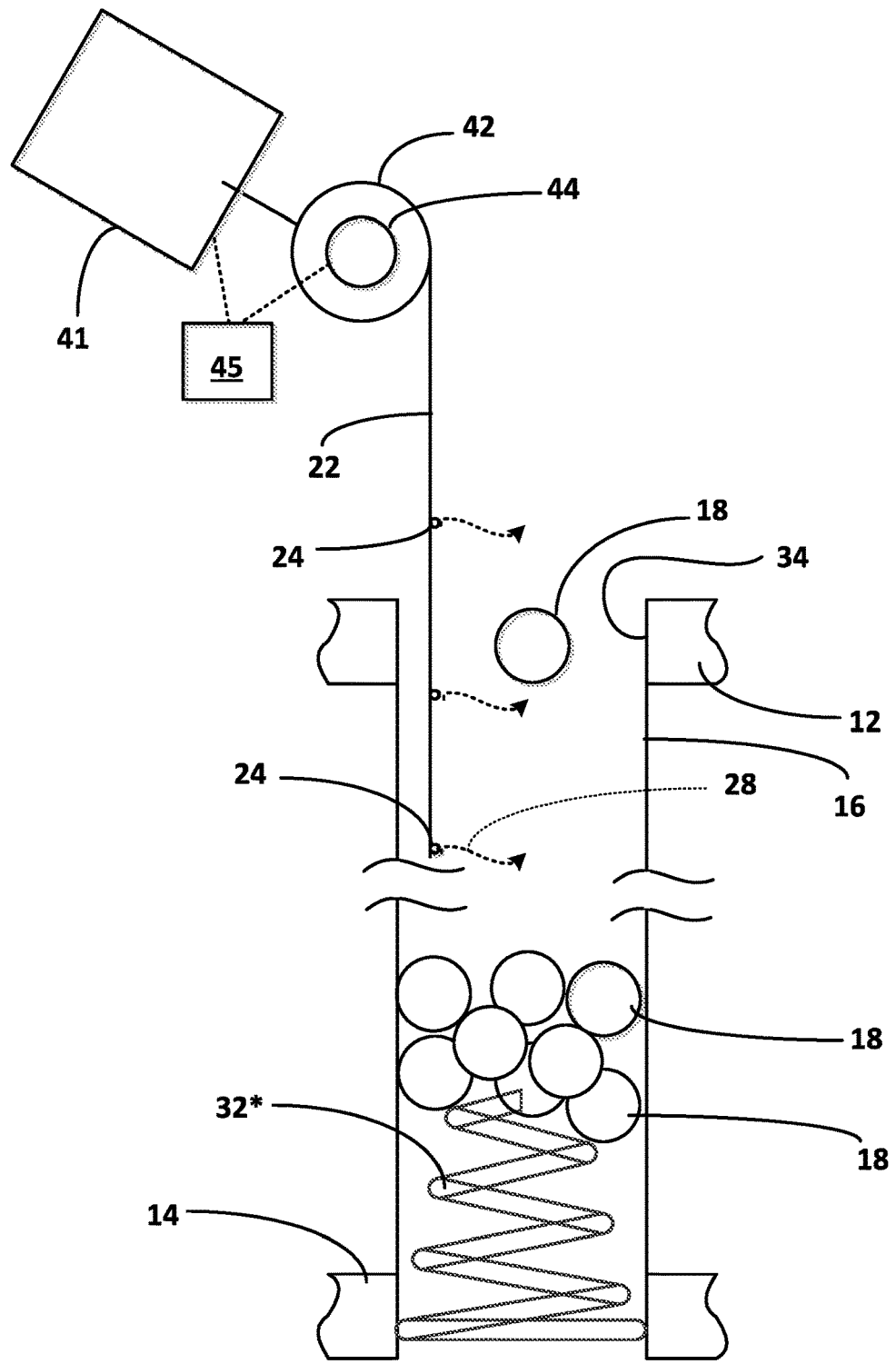
FIG. 9 is a side view of an arrangement, similar to that of FIG. 6, but showing the use of a motorized and encoded hose reel to insert and extract the tubing.

As explained earlier, the bottom end of the receiving tube 16 has a clip or spring 32* (See FIG. 9) to prevent the pellets from falling out the bottom. The bottom end of the receiving tube 16 also may be capped off temporarily with a cap or plug 32 (See FIG. 7) during the loading process in order to prevent the escape of the compressed air through the bottom of the receiving tube 16 during the loading process, or the process may simply rely on the rising bed of catalyst pellets to limit the flow of compressed air out the bottom of the receiving tube 16, as shown in FIG. 9.

A vacuum source 36 (See FIG. 7) is applied to a manifold 38 which is in fluid communication with the inside of the receiving tube 16 at the top of the receiving tube 16 to draw out the air that is being injected into the receiving tube 16 via the injector tubing 22. Any dust particles or fines that may be generated during the handling of the catalyst pellets 18 as they are being loaded into the receiving tube 16 are continuously sucked out of the receiving tube 16 through the manifold 38 and vacuum line 36, resulting in a more dense loading and with less pressure drop across the loaded catalyst tube or bed. Friable pellets designed with high porosity tend to pack more densely and uniformly when dust and fines are removed and kept to a minimum, which is desirable.

Loading Procedure:

To load pellets into a receiving tube 16, the first end 30 of the injector tubing 22 is introduced into the open top of the receiving tube 16 until the first end 30 of the injector tubing 22 is adjacent to the bottom of the receiving tube 16. It should be noted that a miniature video camera, LED light, and an electronic distance sensor such as a laser or acoustic sensor (not shown) may be mounted adjacent to the first end 30 of the injector tubing 22 in order to monitor and measure the position of the first end 30 of the injector tubing 22 relative to the rising bed of loaded pellets as well as to monitor the actual loading of the pellets 18 inside the receiving tube 16.

Once the first end 30 of the injector tubing 22 has been introduced into the receiving tube 16, the compressed air source 26 is activated, as is the vacuum source 36, and the pellets 18 are gradually dropped through the opening 34 in the template, loading sleeve, or other loading device (or just into the open top of the receiving tube 16 if the diameter of the receiving tube 16 is large enough that bridging is not a problem). The pellets 18 flow through the opening 34 into the receiving tube 16. As the pellets 18 fall down into the receiving tube 16, the virtual air "blanket" 28 at each opening 24 in the injector tubing 22 reduces the acceleration of the respective pellet so the pellet falls at a slow velocity until the pellet rests at the bottom of the receiving tube 16 or on top of the rising bed of loaded pellets 18. The injector tubing 22 is gradually lifted out of the receiving tube 16 as the pellets are being loaded, so as to keep the first end 30 of the injector tubing 22 a desired distance above the rising level of settled pellets in the receiving tube 16.

The process of gradually lifting out the injector tubing 22 may be accomplished manually, with an operator watching a video display showing what the video camera at the bottom of the injector tubing 22 is "seeing" or watching an indicator that displays the distance readings from the electronic distance sensor at the first end 30 of the injector tubing 22 in order to keep the first end 30 of the injector tubing 22 a desired distance above the rising level of settled pellets 18.

Alternatively, as shown in FIG. 9, the process of gradually lifting out the injector tubing 22 may be accomplished automatically, with a controller 45 communicating with the camera or distance sensor and with a device that controls the motion of the injector tubing 22 to control the gradual removal of the injector tubing in response to the video display or distance readings to keep the first end 30 of the injector tubing 22 a desired distance above the rising level of pellets 18. For example, the controller 45 may control a motor/gearbox 41 which controls the rotation of a spool or drum 42 to retract the injector tubing 22 from the receptacle 16 at a controlled rate to keep the first end 30 of the injector tubing 22 above the level of the loaded pellets 18 such that the injector tubing 22 does not become engulfed by the pellets 18. An encoder 44 on the rotating drum 42 may be used to provide feedback to the controller 45 for controlling the rate of insertion and extraction of the injector tubing 22 from the receptacle 16.

Figure 10:
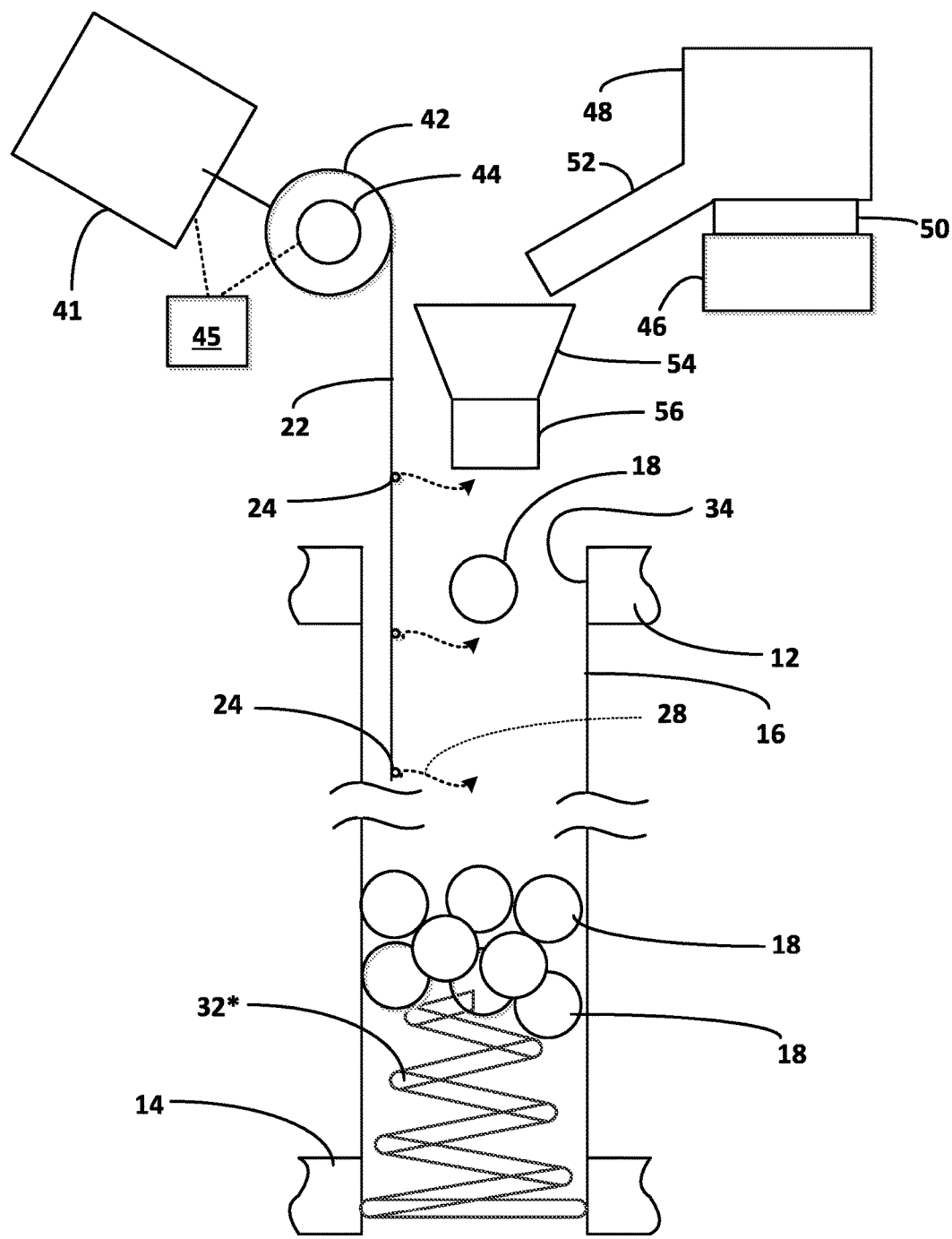
FIG. 10 is a side view, similar to FIG. 9, but showing a hopper, scale and funnel being used to load the pellets.

FIG. 10 shows yet another alternative for controlling the process for lifting out the injector tubing 22. In this arrangement, the injector tubing is gradually removed in response to a weight loss reading from a scale, instead of a video display or a distance reading as explained above. In this embodiment a hopper 48 holding a plurality of pellets 18 is supported by a weigh scale 46. A vibrator 50 is used to gently shake the hopper 48 so that the pellets roll out from the hopper 48 via the hopper outlet chute 52 onto a funnel 54 and, through the reduced diameter funnel outlet 56, falling into the tube 16. The scale 46 takes weight readings continuously or at very short intervals, and sends this data to the controller 45 which calculates the change in weight of pellets in the hopper 48 and uses that information to determine the level of the pellets 18 in the tube 16. The controller 45 sends signals to the device 41 which controls the rotation of the spool or drum 42 to retract the injector tubing 22 from the receptacle 16 at a controlled rate to keep the first end 30 of the injector tubing 22 above the level of the loaded pellets 18 such that the injector tubing 22 does not become engulfed by the pellets 18. An encoder 44 on the rotating drum 42 provides feedback to the controller 45 for controlling the rate of extraction of the injector tubing 22 from the receptacle 16.

Once the receiving tube or receptacle 16 is loaded with pellets 18 to the desired elevation, the manifold 38, injector tubing 22, and any template, loading sleeve, bottom cap, or other loading devices are removed.

While the foregoing description generally relates to the loading of catalyst pellets or other pellets into the reactor tubes of a vertical tube chemical reactor, the arrangement also may be used for loading other types of pellets into other types of receiving tubes or other receptacles extending downwardly from a top opening. It will be obvious to those skilled in the art that modifications may be made to the embodiments described above without departing from the scope of the present invention as claimed.

What is claimed is:

1. A method for loading pellets into a receptacle, comprising the steps of:
    providing a receptacle having an open top end and a bottom end;
    inserting a first end of injector tubing into the top end of the receptacle and extending down to a point near the bottom end, said injector tubing defining a plurality of vertically-spaced-apart openings;
    injecting pressurized fluid into said injector tubing, wherein said pressurized fluid flows out through said vertically-spaced-apart openings; and
    sequentially dropping a plurality of pellets into the open top end of said receptacle while said pressurized fluid is flowing through said injector tubing and through said vertically-spaced-apart-openings, said pressurized fluid reducing the acceleration of the pellets as the pellets fall.

2. A method for loading pellets into a receptacle as recited in claim 1, and further comprising the step of gradually removing said injector tubing from said receptacle as said pellets settle in said receptacle, forming a rising level of settled pellets in said receptacle, so as to maintain the first end of said injector tubing above said level of settled pellets as said pellets continue to be dropped into said receptacle.

3. A method for loading pellets into a receptacle as recited in claim 2, and further comprising the step of applying a vacuum at the top of said receptacle to remove said pressurized fluid and to remove dust particles that are lifted out of the stream of falling pellets by said pressurized fluid.

4. A method for loading pellets into a receptacle as recited in claim 3, wherein said first end of said injector tubing is closed.

5. A method for loading pellets into a receptacle as recited in claim 3, wherein said vertically-spaced-apart openings are radially aligned.

6. A method for loading pellets into a receptacle as recited in claim 3, and further comprising a camera mounted adjacent to said first end of said injector tubing, wherein said camera monitors said pellets.

7. A method for loading pellets into a receptacle as recited in claim 3, and further comprising a distance sensor mounted adjacent to said first end of said injector tubing, wherein said distance sensor monitors the level of settled pellets in said receptacle.

8. A method for loading pellets into a receptacle as recited in claim 7, and further comprising a controller, which communicates with said distance sensor and with an injection tubing drive and which controls the removal of said injection tubing from said receptacle in response to the rising level of settled pellets in said receptacle as measured by said distance sensor.

9. A method for loading pellets into a receptacle as recited in claim 8, wherein said first end of said injection tubing is closed.

10. A method for loading pellets into a receptacle as recited in claim 9, wherein said vertically-spaced-apart openings are radially aligned.

11. A method for loading pellets into a receptacle as recited in claim 10, wherein the bottom end of said receptacle is temporarily closed while the pellets are being loaded into said receptacle and wherein said bottom end of said receptacle is reopened once the pellets have been loaded.

12. A method for loading pellets into a receptacle as recited in claim 3, wherein the bottom end of said receptacle is temporarily closed while the pellets are being loaded into said receptacle and wherein said bottom end of said receptacle is reopened once the pellets have been loaded.

13. A method for loading pellets into a receptacle as recited in claim 2, wherein the step of gradually removing said injector tubing from said receptacle is controlled by a controller, which communicates with an injection tubing drive, with an injection tubing spool encoder, and with at least one of the group consisting of a camera, a distance sensor, and a weight scale to automatically control said gradual removal of said injector tubing.

14. A method for loading pellets into a receptacle as recited in claim 3, wherein the step of gradually removing said injector tubing from said receptacle is controlled by a controller, which communicates with an injection tubing drive, with an injection tubing spool encoder, and with at least one of the group consisting of a camera, a distance sensor, and a weight scale to automatically control said gradual removal of said injector tubing.

* * * * *